United States Patent
Azizian

(10) Patent No.: US 6,599,429 B1
(45) Date of Patent: Jul. 29, 2003

(54) WATER TREATMENT PRODUCT AND METHOD

(75) Inventor: Farid Azizian, Bicester (GB)

(73) Assignee: Alcan International Limited, Montreal (CA)

(*) Notice: Subject to any disclaimer, the term of this patent is extended or adjusted under 35 U.S.C. 154(b) by 106 days.

(21) Appl. No.: 09/671,720

(22) Filed: Sep. 27, 2000

Related U.S. Application Data

(63) Continuation-in-part of application No. PCT/GB99/01026, filed on Apr. 1, 1999.

(30) Foreign Application Priority Data

Apr. 1, 1998 (GB) .............................................. 9807071
Aug. 7, 1998 (GB) .............................................. 9817295

(51) Int. Cl.[7] .................................................. C02F 1/28
(52) U.S. Cl. ....................... 210/681; 210/688; 210/807; 210/192; 210/263; 210/502.1; 210/506; 210/912
(58) Field of Search ................................. 210/681, 688, 210/807, 192, 263, 502.1, 504, 506, 908, 912, 915

(56) References Cited

U.S. PATENT DOCUMENTS

| 3,499,837 A | | 3/1970 | Jaunarajs |
| 4,040,982 A | | 8/1977 | Basilia et al. |
| 4,459,370 A | | 7/1984 | van der Wal et al. |
| 4,946,592 A | | 8/1990 | Galaj et al. |
| 5,271,848 A | * | 12/1993 | Smith et al. |
| 5,369,072 A | | 11/1994 | Benjamin et al. |

FOREIGN PATENT DOCUMENTS

| CA | 1067627 | 12/1979 |
| CH | 509946 | 7/1971 |
| GB | 1195289 | 6/1970 |
| GB | 2191114 A | 12/1987 |
| HU | 187422 | 12/1987 |

OTHER PUBLICATIONS

English Language Abstract of Soviet Patent Document No. 1 551 659, World Patent Index, No. XP–002108113, Mar. 23, 1990.
English Language Abstract of Chinese Patent Document No. 1 099 731, World Patent Index, No. XP–002108114, Mar. 8, 1995.
English translation of Hungarian Patent No. 187 422, see above, (Dec. 23, 1987).
Klára Polyák, Eleonóra Rácz and József Hlavay, "Surface Properties Of Fe(OH)$_3$ Adsorbent Prepared On Aluminum–Oxide, I", University of Vaszprém (7 pp) including English translation (12pp), (Jan. 2, 1995).
J. Hlavay, K. Földi–Polyák, and J. Inczédy, *Application Of New Adsorbents For Removal Of Arsenic From Drinking Water*, Chemistry For Protection Of The Environment, pp. 119–130 (1988).
J. Hlavay, K. Földi–Polyák, and J. Inczédy, *Removal Of Arsenic From Natural Waters*, Chemistry for Protection Of The Environment, pp. 373–380 (1984).

* cited by examiner

*Primary Examiner*—Betsey Morrison Hoey
(74) *Attorney, Agent, or Firm*—Cooper & Dunham LLP

(57) ABSTRACT

A water treatment product which is a particulate material having a specific surface area of at least 1.0 m$^2$/g, or an artefact formed by bonding together such particulate material, and having an insoluble ferric iron coating. Perferably, the particulate material is an alumina-based material. The product is useful in the treatment of water to remove organic materials, cations or anions, and more particularly heavy metals, As, Se or F. Methods of making the water product are also provided.

12 Claims, 3 Drawing Sheets

WATER TREATMENT PRODUCT AND METHOD

Figure 1:
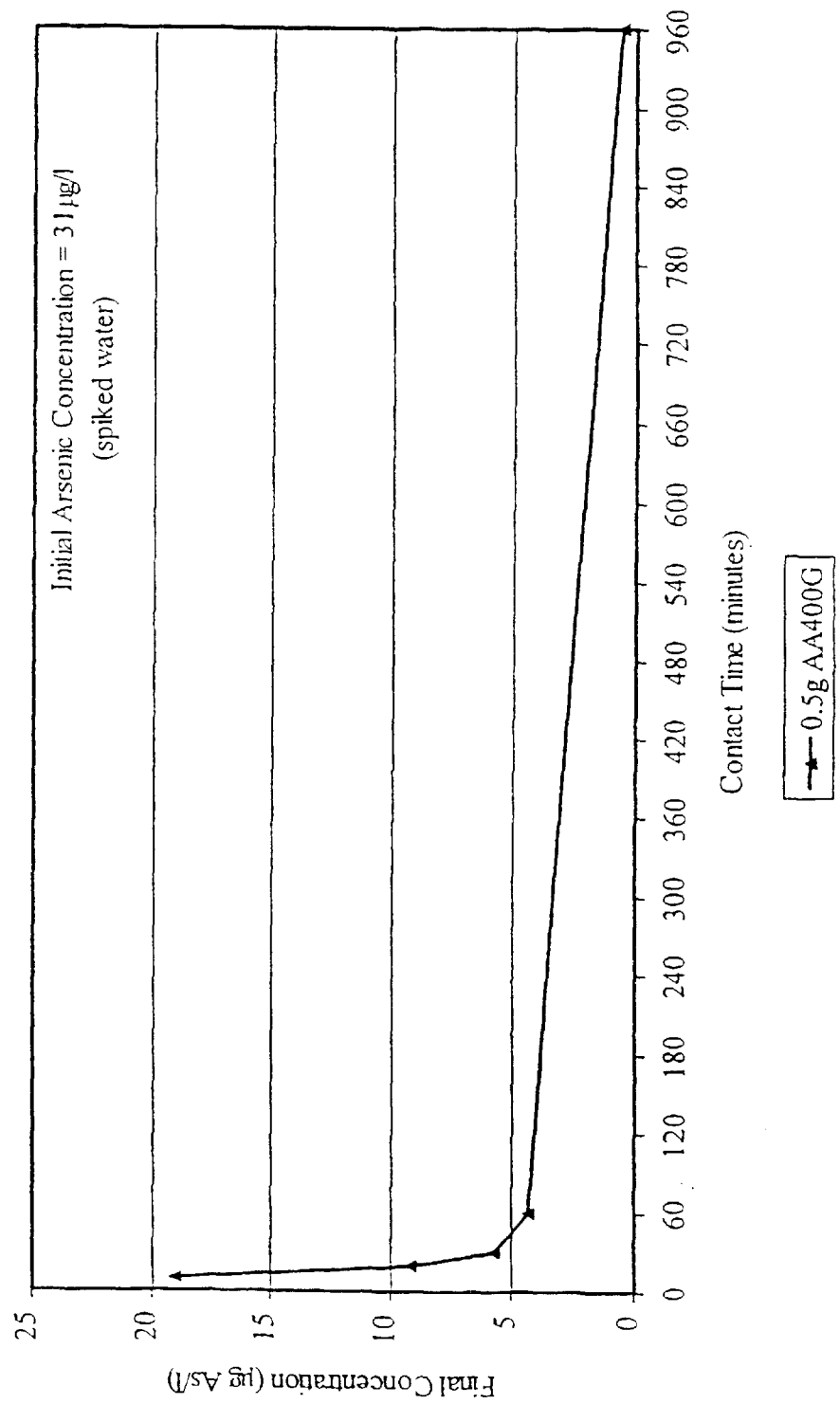

This application is a continuation-in-part of International Application No. PCT/GB99/01026 with an international filing date of Apr. 1, 1999.

As discharge limits for metals tighten, adsorption processes for high level treatment of metal bearing wastes becomes increasingly attractive. Adsorption is capable of removing many metals over a wider pH range and to much lower levels than precipitation. Additionally, adsorption can often remove complexed metals which would not be checked by conventional treatment processes.

An adsorbent commonly present in metal treatment processes is an amorphous iron oxide called ferrihydrite. A disadvantage of such treatment is that ferrihydrite forms a sludge product from which it is difficult to recover purified water. In order to address this problem, a water treatment product has been described which consists of washed sand coated with ferrihydrite (M Edwards and M M Benjamin, Jnl. Water Poll Control Fed, Vol 61, Part 9, 1989, pages 1523–1533). That product has also been tested for removal of arsenic from drinking water (F G A Vagliasindi et at, Proceedings Water Quality Technology Conference, Part 2, New Orleans, Nov. 12–16 1995, pages 1829–1853).

In Europe and USA the permitted quantities of arsenic in drinking water have been, or will shortly be, reduced from 200 $\mu$g/l to 50 $\mu$g/l and on to 20 or 10 $\mu$g/l. As a water treatment product for removing arsenic, activated alumina has been proposed (Canadian patent 2,090,989). The particles of activated alumina are robust and readily separable from treated water. Although activated alumina is by itself an active adsorbent of arsenic and other heavy metals, there is a need for an even better material. This need has been addressed in WO 96/37438, which proposes water treatment compositions comprising lanthanum oxides and alumina. But lanthanum oxides would be prohibitively expensive for the treatment of very large volumes of water.

According to the present invention there is provided a water treatment product which is a particulate material having a specific surface area of at least 1.0 $M^2$/g, or an artefact formed by bonding together such particulate material, and having an insoluble ferric iron coating. Preferably, the particulate material is porous and may have through pores, closed pores or both. The artefacts formed from the particulate material are typically cylindrical or brick shaped.

The particulate material is preferably non-metallic and a mineral or inorganic material. Preferred materials which may act predominantly as substrates for the ferric iron coating, include Zeolites, Ferrierite, Mordenite, Sodalite, pillared clays and activated clays. Preferred are alumina-based materials including alumina itself and bauxite. The particulate material or the artefact formed therefrom is preferably robust, resistant to crushing, and does not form a fine powder or sludge during use.

The individual particles in the particulate material, which may be accretions of fine particles, need to be sufficiently large to be easily separable from treated water. The individual particles may be as fine as having a mean size of 5 $\mu$m or 10 $\mu$m, although coarse particles are more readily separated from the treated water. Preferably the individual particles have a mean size of 100 $\mu$m to 5000 $\mu$m, e.g. from 200 $\mu$m–1000 $\mu$m. They may be formed by agglomeration or pelleting or crushing.

The particulate material used herein may be of alumina trihydrate as produced by the Bayer process, or calcined alumina. Preferably there is used activated alumina, a product formed by heating alumina trihydrate at 300–800° C. Activated alumina has the advantage of a large specific surface area. Thus for example the commercial product AA400G has a specific surface area of 260–380 $m^2$/g. Alternatively, the porous medium may be of bauxite, or other alumina-containing mineral such as zeolite, clay or hydrotalcite. The non-volatile content of bauxite comprises from 40 or 50–95 wt % of alumina together with from 3 or 5–25 wt % of ferric oxide. Activated bauxite is a preferred material which may be formed by heating the mineral at a temperature in the range 300–800° C., and may typically have a specific surface area of from 100 or 150–200 $m^2$/g. Because the iron content of bauxite is present in, rather than on, the particle surface, it is generally not counted as part of the insoluble ferric iron coating of this invention.

Particulate materials having a high specific surface area show a high capacity for adsorbing contaminants and removing them from water. The water treatment product of this invention preferably has a specific surface area of 1.0–400 $m^2$/g, e.g. at least 10 $m^2$/g, particularly at least 100 $m^2$/g.

The particulate material may be provided with a precipitated insoluble ferric iron coating by soaking it in a ferric solution, e.g. an aqueous solution of ferric sulphate or ferric chloride. Then the water is removed by evaporation or otherwise and the product dried at elevated temperature, e.g. of 50–500° C. and preferably 50–200° C., to convert ferric salts to an insoluble ferric iron coating, probably a hydrated ferric oxide or ferrihydrate. The preparative technique described in the M Edwards reference noted above is suitable. The ferric iron coating may constitute from 0.01% to 50%, preferably 0.1% to 10%, by weight of the water treatment product.

Another way of providing a coated particulate material which has been found particularly suitable for large scale operation is as follows: a suitable grade of activated alumina (such as AA400G28–48 mesh) is saturated in a ferric solution, for example of ferric chloride or preferably ferric sulphate with periodic agitation for up to about 6 hours. Sodium hydroxide solution is added to complete the hydrolysis and form an insoluble hydrated ferric iron oxide coating on the activated alumina using a means such as a pH meter to control the pH to 7.5 to 8. The product is rinsed thoroughly to remove all fine material and dried either at room temperature or at elevated temperature.

An alternative method of making a water treatment product according to the invention comprises treating a ferruginous ore with acid liquid so as to leach out iron from the ore, and then raising the pH of the liquid so as to form a precipitated ferric iron coating on the surface of the ore. For example, the ore may be treated with hydrochloric acid at a pH of around 3, and the pH subsequently raised to about 7 by use of sodium hydroxide. The resulting product is filtered, washed and dried preferably at elevated temperature as before. Also included within the scope of the invention is a water treatment product which is a ferruginous ore having a precipitated ferric iron coating on its surface. Preferably the ore is bauxite particularly activated bauxite.

As demonstrated in the examples below, the water treatment product of this invention has a combination of useful properties: excellent capacity and avidity for rapidly adsorbing inorganic contaminants from water being treated; robust material which is easily separable from treated water and can be treated to recover inorganic contaminants and so permit reuse without losing its structure.

The invention also includes a water treatment method, which method comprises contacting water to be treated with the water treatment product herein described, and thereafter recovering treated water containing a reduced concentration of an organic material or cation or anion particularly at least one heavy metal or As or Se or F. Batch treatment typically involves agitating the water to be treated with an aliquot of the water treatment product, the amount of which is chosen in order to achieve a desired degree of water purification in a desired time, typically less than 1 hour. Continuous methods are also possible as well known in the art.

Optimum conditions for removal of organic materials and of inorganic materials are generally different. Depending on the nature of the contaminant to be removed, it may be advantageous to adjust the pH of the water in order to improve the performance of the water treatment product. Thus for example, arsenic is best removed at a pH of 5 to 7 preferably 5.5, while fluoride is best removed at a pH of 6 to 8 preferably 7.

EXAMPLE 1

Doping Procedure

As ferric salt solutions the chloride and sulphate were initially used. Both the ferric chloride and ferric sulphate solutions are classified as drinking water grades, which are suitable in potable, water treatment. The ferric chloride solution was supplied as 10.58 w % Fe ion and the ferric sulphate solution was supplied as 12.0 w % Fe ion.

Activated alumina AA400G (28×48 mesh size; 0.3–0.6 mm) was doped in ferric salt solutions according to the following samples:

Sample 1:

9.5 g of the ferric chloride concentrate was diluted to 1000 ml with distilled water. 1000 g of AA400G were added to this solution and the slurry was stirred to ensure an even coating of the salt on the alumina. Once the alumina had taken up (adsorbed) all of the liquid, the sample was transferred to a tray and dried in an oven at 160° C. for 3 hours. After this period of drying all of the samples were free flowing. After drying, the samples were washed to remove surface dust. Preferably they are then immersed in water/sodium carbonate solution for 24 hours to ensure almost complete hydrolysis of the ferric salt and to prevent any iron salt leaching out. The product contained approximately 0.15 wt % Fe as $Fe_2O_3$.

Sample 2:

47.2 g of the ferric chloride concentrate was diluted to 1000 ml with distilled water. 1000 g of AA400G were added to this solution and the slurry was stirred to ensure an even coating of the salt on the alumina. This was then followed up as in Sample 1. The product contained 0.61 wt% Fe as $Fe_2O_3$.

Sample 3:

8.3 g of the ferric sulphate concentrate was diluted to 1000 ml with distilled water. 1000 g of AA400G were added to this solution and the slurry was stirred to ensure an even coating of the salt on the alumina. This was then followed up as in Sample 1. The product contained approximately 0.15 wt % Fe as $Fe_2O_3$.

Sample 4:

41.2 g of the ferric sulphate concentrate was diluted to 1000 ml with distilled water. 1000 g of AA400G were added to this solution and the slurry was stirred to ensure an even coating of the salt on the alumina. This was then followed up as in Sample 1. The product contained 0.63 wt % Fe as $Fe_2O_3$.

Sample 5:

412 g of the ferric sulphate concentrate was diluted to 1000 ml with distilled water. 1000 g of AA400G were added to this solution and the slurry was stirred to ensure an even coating of the salt on the alumina. This was then followed up as in Sample 1. The product contained 6.0 wt % Fe as $Fe_2O_3$.

Jar Test Experiments a) A jar test was carried out at room temperature (~20° C.). The particulate materials used included activated alumina AA400G and AA400G iron doped according to the above mentioned procedures. A prefixed amount of the particulate material, in a range of 0.05 g, 0.1 g, 0.5 g and 1 g, was weighed into a 250 ml conical flask equipped with a magnetic follower. To this, 200 ml of raw water (contaminated water) was added and stirred magnetically for a period of time of 10 minutes to several days. After stirring, the solutions were filtered using 0.2 $\mu$m membrane filters.

b) 5 g of the particulate material were placed in a flask equipped with a magnetic follower. To this, 1000 ml of raw water (contaminated water) was added and stirred magnetically for a period of 1 hour, during which, at intervals of 1, 5 and 10 minutes, samples were withdrawn and were filtered using 0.2 $\mu$m membrane filters.

Analysis

Arsenic in solution is measured by atomic absorption spectrometry (hydride generation-atomic absorption method), which can detect trace limit of 2 $\mu$g/l or under favourable conditions as low as 0.5 $\mu$g/l.

EXAMPLE 2

Use of Iron Oxide Coated Activated Alumina to Remove Fluoride

To examine the effectiveness of the iron oxide coated activated alumina to remove fluoride compared with untreated activated alumina, the following test was conducted.

1. A solution containing ~20 mg/l F was prepared and analysed for fluoride concentration using a selective ion electrode.
2. 0.05 g, 0.1 g and 0.5 g samples of the various particulate materials were placed in containers.
3. 200 ml of the fluoride solution was added to each container.
4. Using magnetic stirrers, the containers were stirred overnight at room temperature.
5. Approximately 50 ml of the slurry was syringed from each container and filtered.
6. The fluoride concentration of each filtered solution was analysed using a selective ion electrode.

Media tested were

AA400G—commercially available activated alumina.

Sample 2

Sample 4

Sample 5

Results

The starting fluoride concentration was 21 mg/l F. The results shown in the table below are the final concentrations of F in mg/l.

|  | Particulate Material Addition | | |
| --- | --- | --- | --- |
|  | 0.05 g | 0.1 g | 0.5 g |
| AA400G | 19.5 | 19.0 | 17.3 |
| Sample 2 | 15.9 | 11.9 | 12.5 |
| Sample 4 | 19.0 | 18.1 | 13.2 |
| Sample 5 | 19.3 | 18.1 | 11.4 |

Conclusions

The use of iron coated activated alumina enabled greater fluoride removal than untreated activated alumina particularly at media addition levels of 0.1 g and above. Increasing the amount of iron oxide present on the activated alumina surface increased the amount of fluoride removed.

EXAMPLE 3

A jar test experiment was done as described in Example 1. The water tested was wastewater containing 26 mg/l of arsenic. The particulate materials tested were the product of sample 5 (Example 1 containing 6.0 wt % Fe as $Fe_2O_3$) here referred to as AAFS50, and (for comparison) commercial activated alumina AA400G. 1.5g or 2g of particulate material were maintained in contact with 200 ml of wastewater for 30 or 60 minutes. The results are set out in Table 1 below.

TABLE 1

Arsenic removal from wastewater using Iron coated Activated alumina

| Media | wt of particulate material (g) | Contact Time (minutes) | Final Arsenic Concentration (mg/l) |
| --- | --- | --- | --- |
| AAFS50 | 1.5 | 30 | 0.58 |
| AA400G | 1.5 | 30 | 3.32 |
| AAFS50 | 2 | 60 | 0.35 |
| AA400G | 2 | 60 | 0.78 |

EXAMPLE 4

Jar test experiments were performed as described in Example 1, using borehole water containing an initial arsenic content concentration of 14.7 $\mu$g/l. 200 ml samples of the water were stirred with various different quantities of the particulate material for various different contact times. The results are set out in Table 2.

TABLE 2

Arsenic removal from borehole water using activated Alumina AA400G or iron oxide coated AAFS50

| wt of particulate material (g) | Contact Time (minutes) | AA400G Final Arsenic Concentration ($\mu$g/l) | AAFS50 Final Arsenic Concentration ($\mu$g/l) |
| --- | --- | --- | --- |
| 0.1 | 10 | 4 | <=0.5 |
| 0.1 | 20 | 2 | <=0.5 |
| 0.1 | 30 | 1.7 | <=0.5 |
| 0.1 | 60 | 0.6 | <=0.5 |

TABLE 2-continued

Arsenic removal from borehole water using activated Alumina AA400G or iron oxide coated AAFS50

| wt of particulate material (g) | Contact Time (minutes) | AA400G Final Arsenic Concentration ($\mu$g/l) | AAFS50 Final Arsenic Concentration ($\mu$g/l) |
| --- | --- | --- | --- |
| 0.1 | 960 | 0.5 | <=0.5 |
| 0.5 | 10 | 0.97 | <=0.5 |
| 0.5 | 20 | <=0.5 | <=0.5 |
| 0.5 | 30 | <=0.5 | <=0.5 |
| 0.5 | 60 | <=0.5 | <=0.5 |
| 0.5 | 960 | <=0.5 | <=0.5 |
| 1 | 10 | 0.56 | <=0.5 |
| 1 | 20 | <=0.5 | <=0.5 |
| 1 | 30 | <=0.5 | <=0.5 |
| 1 | 60 | <=0.5 | <=0.5 |
| 1 | 960 | <=0.5 | <=0.5 |

EXAMPLE 5

Figure 2:
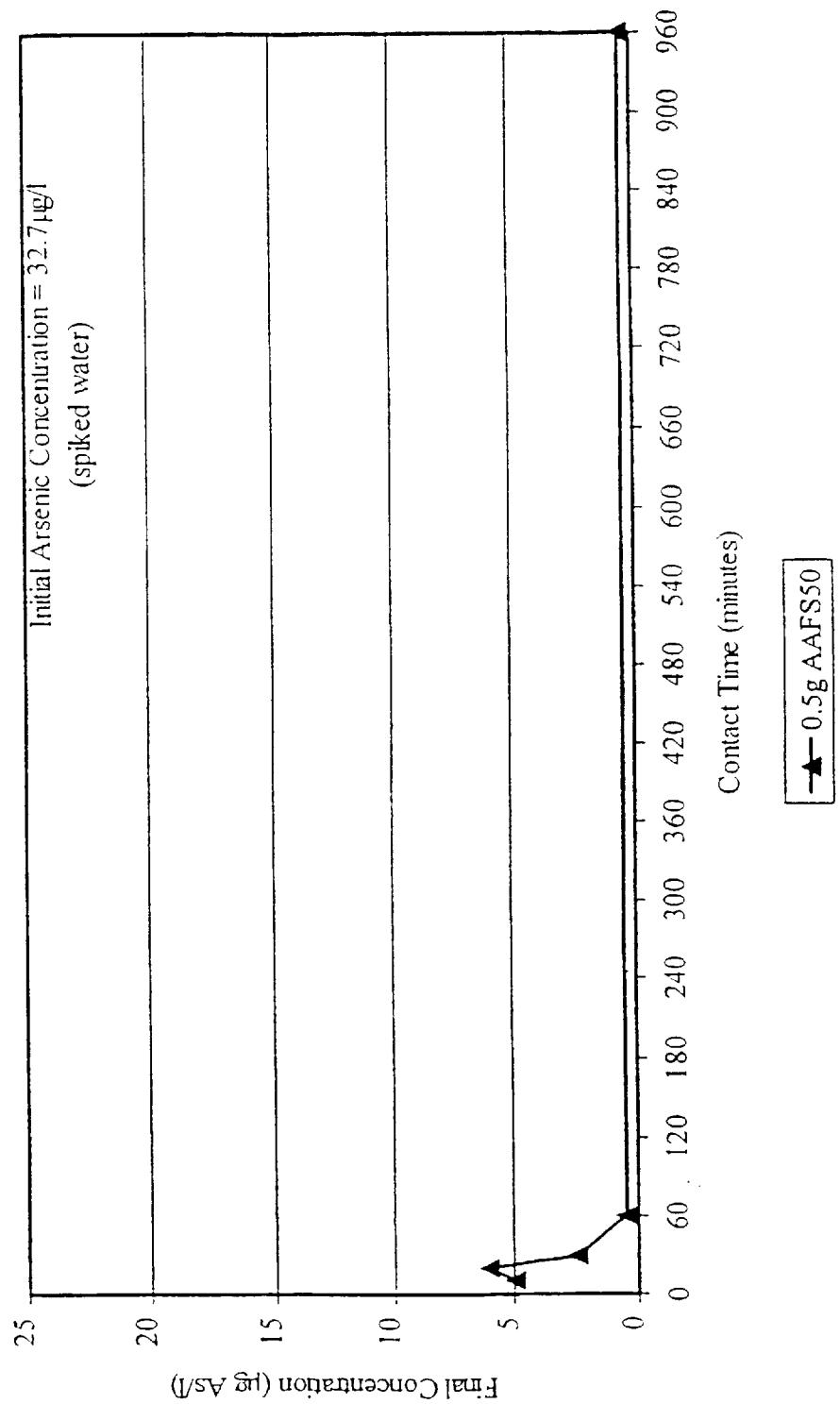

Jar test experiments were performed as described above, using de-ionised water spiked with about 31 to 33 $\mu$g/l of arsenic as sodium arsenate. The two particulate materials were those described previously, activated alumina AA400G, and an iron oxide coated activated alumina AAFS50. Different amounts of each particulate material (0.1g, 0.5g and 1.0g) were stirred with 200 ml of the test water for different periods of time (10, 20, 30, 60 minutes and 16 hours (960 minutes)). The results are set out in the accompanying FIGS. 1 and 2 which are graphs showing final arsenic concentration against contact time.

EXAMPLE 6

Figure 3:
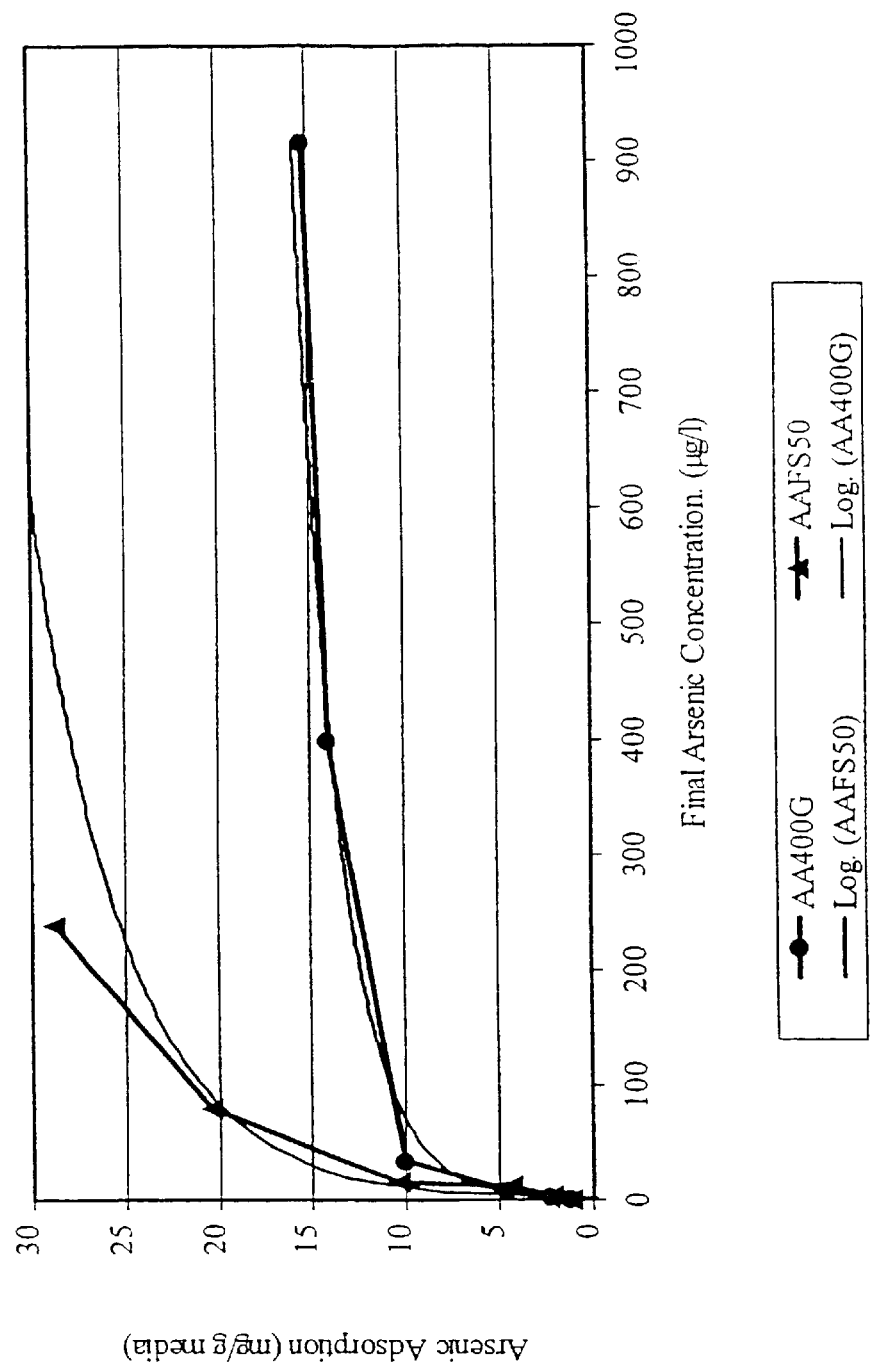

Jar test experiments were performed as described above, using de-ionised water spiked with up to 1700 $\mu$g/l of arsenic as sodium arsenate. The two particulate materials were those described in Example 5 and used at 0.05 g of the material per 1000 ml of the arsenic solution and stirred for 960 minutes. The results are shown in FIG. 3.

What is claimed is:

1. A water treatment method, which method comprises providing a water treatment product, said product being a particulate material having a mean particle size of at least 5 $\mu$m and a specific surface area of at least 10 m$^2$/g, or an artefact formed by bonding together such particulate material, and having an insoluble hydrated ferric iron oxide coating, contacting water to be treated with said water treatment product, and thereafter recovering treated water containing a reduced As concentration of not more than 10 $\mu$g/l.

2. The water treatment method of claim 1, wherein the particulate material has a mean particle size of 100 $\mu$m to 5000 $\mu$m.

3. The water treatment method of claim 1, wherein the particulate material is an alumina-based material.

4. The water treatment method of claim 3, wherein the alumina-based material is selected from bauxite, alumina trihydrate and alumina.

5. The water treatment method of claim 3, wherein the alumina-based material is activated alumina or activated bauxite.

6. The water treatment method of claim 1, wherein the particulate material has a specific surface area of at least 100 m$^2$/g.

7. The water treatment method of claim 1, which is a ferruginous ore having a precipitated ferric iron coating on its surface.

8. The water treatment method of claim 7, wherein the ore is bauxite.

9. The water treatment method of claim 8, wherein the bauxite is activated bauxite.

10. A water treatment product, said product being a particulate alumina-based material having a mean particle size of at least 5 $\mu$m and a specific surface area of at least 10 $m^2/g$, or an artefact formed by bonding together such particulate alumina-based material, and having an insoluble hydrated ferric iron oxide coating, wherein said product has a capacity for adsorbing inorganic contaminants from water to be treated.

11. A method of making a water treatment product, said product being a particulate alumina-based material having a mean particle size of at least 5 $\mu$m and a specific surface area of at least 10 $m^2/g$, or an artefact formed by bonding together such particulate alumina-based material, and having an insoluble hydrated ferric iron oxide coating, which method comprises soaking the particulate alumina-based material or an artefact formed from the particulate alumina-based material in a ferric solution, and recovering and drying the coated particulate alumina-based material or artefact, wherein said product has a capacity for adsorbing inorganic contaminants from water to be treated.

12. A method of making a water treatment product as claimed in claim 11, said method comprising treating a ferruginous ore with acid liquid so as to leach out iron from the ore, and then raising the pH of the liquid so as to form a precipitated ferric iron coating on the surface of the ore.

* * * * *